US006225993B1

(12) United States Patent
Lindblad et al.

(10) Patent No.: US 6,225,993 B1
(45) Date of Patent: *May 1, 2001

(54) VIDEO ON DEMAND APPLET METHOD AND APPARATUS FOR INCLUSION OF MOTION VIDEO IN MULTIMEDIA DOCUMENTS

(75) Inventors: Christopher Lindblad, Stanford, CA (US); Stephan E. Cachat, Taninges (FR)

(73) Assignee: Sun Microsystems, Inc., Palto Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/636,118

(22) Filed: Apr. 22, 1996

(51) Int. Cl.[7] ................................................. H04N 7/173
(52) U.S. Cl. ............................. 345/327; 709/219; 348/7; 348/10
(58) Field of Search ................................. 370/352, 389, 370/485–487; 345/327, 302, 328, 525, 526; 348/6, 7, 10, 12; 455/3.1, 4.1, 4.2, 5.1; 395/200.32, 200.33, 200.47–200.49, 200.61; 709/217, 218, 219, 216

(56) References Cited

U.S. PATENT DOCUMENTS 5,461,415 * 10/1995 Wolf et al. ................................. 348/7
5,491,800 * 2/1996 Goldsmith et al. ................... 395/800

(List continued on next page.)

FOREIGN PATENT DOCUMENTS 0 680 213   11/1995   (EP) .

OTHER PUBLICATIONS

Wong et al., "Synchronization in Specification–based Multimedia Presentations," Software—Practice and Experience, vol. 26, No. 1, Jan. 1996, pp. 71–81.

(List continued on next page.)

Primary Examiner—Chris Grant
(74) Attorney, Agent, or Firm—Conley, Rose & Tayon; B. Noel Kivlin

(57) ABSTRACT

A computer process which requests streams of motion video titles and decodes and displays the motion video signals of the stream for display in a computer display device is constructed in the form of an applet of a multimedia document viewer such as a World Wide Web browser. Accordingly, a designer of multimedia documents such as HTML pages can easily incorporate motion video titles into such HTML pages by specifying a few parameters of a desired title or a desired portion of a title to be requested from a video server. The applet builds bit stream control signals from the specification of the title or the portion of the title. The bit stream control signals request transmission of the title or the portion of the title from a bit stream server such as a video server and are in a form appropriate for processing by the bit stream server. The applet transmits the bit stream control signals to the bit stream server to thereby request that the bit stream server initiate transmission of a bit stream representing the requested title or the requested portion of the title. The applet also builds decoder control signals from the specification of the title or the portion of the title. The decoder control signals direct a bit stream decoder to receive the requested bit stream from the bit stream server and to decode a motion video signal from the bit stream. The applet transmits the decoder control signals to the decoder to cause the decoder to receive the bit stream and to decode the motion video signal from the bit stream.

45 Claims, 3 Drawing Sheets

Microfiche Appendix Included
(1 Microfiche, 98 Pages)

U.S. PATENT DOCUMENTS 5,682,511 * 10/1997 Sposato et al. .................. 348/13
5,742,768 * 4/1998 Gennaro et al. ................. 395/761
5,805,153 * 9/1998 Nielsen ............................ 345/327

OTHER PUBLICATIONS

Chen et al., "Real Time Video and Audio in the World Wide Web," 4th International World Wide Web Conference, Dec. 1995, pp. 1–14.

European Search Report, Application No. 97 30 2676, mailed Jul. 12, 1999.

* cited by examiner

VIDEO ON DEMAND APPLET METHOD AND APPARATUS FOR INCLUSION OF MOTION VIDEO IN MULTIMEDIA DOCUMENTS

CROSS REFERENCE TO MICROFICHE APPENDIX

Appendix A, which is a part of this disclosure, is a microfiche appendix consisting of one (1) sheet of microfiche having a total of ninety-eight (98) frames. Microfiche Appendix A is a list of computer programs and related data in one embodiment of the present invention, which is described more completely below.

SPECIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to computer graphical display of motion video and, in particular, to a method and apparatus for facilitating inclusion of motion video in multimedia computer displays.

BACKGROUND OF THE INVENTION

Video servers, including networked video servers, transmit "bit streams" to a video client. Such bit streams, which are sometimes referred to as "streams," generally represent video and/or audio signals which represent titles in a library of multimedia sources. Examples of titles of such a library typically include recordings of motion pictures. In general, a video server receives from a video client a request for a particular title and transmits a stream of the particular title to the video client. An example of a video client is a set top box which is generally known and which decodes the stream received from the video server and transmits the decoded signal to a connected television. The requesting of a particular title, receiving the stream of the particular title, and decoding the stream for display on a television are collectively and generally referred to as video on demand.

Examples of such video on demand servers are described in U.S. Pat. No. 5,862,450 by Kallol Mandal and Steven Kleiman and entitled "Method and Apparatus for Delivering Simultaneous Constant Bit Rate Compressed Video Streams at Arbitrary Bit Rates with Constrained Drift and Jitter" (hereinafter the '450 Patent) and in U.S. patent application Ser. No. 08/572,648, filed Dec. 14, 1995 by Kallol Mandal and Steven Kleiman and entitled "Method and Apparatus for Distributing Network Bandwidth on a Video Server for Transmission of Bit Streams Across Multiple Network Interfaces Connected to a Single Internet Protocol (IP) Network" (hereinafter the '648 Application). Both the '639 Patent and the '648 Application are incorporated herein in their entirety by reference.

The popularity of the Internet global network is growing extremely rapidly, and perhaps the most popular protocol of the Internet is the Hyper Text Transfer Protocol (HTTP) of the World Wide Web. According to the HTTP protocol of the World Wide Web, documents, which are generally referred to as "pages," incorporate text, graphical images, sound, and motion video which, when viewed, form a multimedia presentation to user. Such pages are typically viewed using a World Wide Web browser, which is a computer process capable of retrieving HTTP pages and presenting the contents of such pages to a user of a computer system through output devices such as a computer video display device and a computer audio circuit coupled to one or more audio speakers. An example of a World Wide Web browser is the Netscape browser available from Netscape Communications Corporation of Mountain View, Calif.

To display motion video, conventional browsers typically (i) transfer to the computer system in which the browser executes an entire data file which includes data representing a title and (ii) subsequently initiate execution of a player computer process which displays the title to the user on a computer display device. The player computer process is separate from the browser and therefore displays the motion video of the title outside of the page displayed by the browser. In addition, transferring the entire data file prior to displaying the motion video of the title delays substantially the display of the motion video since such data files are typically quite large, e.g., typically 1.8 gigabytes of data to represent a two-hour, VHS-quality motion picture.

Currently, no browser is capable of seamlessly integrating motion video streams into a page of the World Wide Web.

SUMMARY OF THE INVENTION

In accordance with the present invention, a computer process which requests streams of motion video titles and decodes and displays the motion video signals of the stream for display in a computer display device is constructed in the form of an applet of a multimedia document viewer such as a World Wide Web browser. Accordingly, a designer of multimedia documents such as HTML pages can easily incorporate motion video titles into such HTML pages by specifying a few parameters of a desired title or a desired portion of a title to be requested from a video server. The specification of the parameters is in the general form of a well-known parameter specification format dictated by the particular interface of the computer instruction language in which the applet is written.

The applet builds bit stream control signals from the specification of the title or the portion of the title. The bit stream control signals request transmission of the title or the portion of the title from a bit stream server such as a video server and are in a form appropriate for processing by the bit stream server. The applet transmits the bit stream control signals to the bit stream server to thereby request that the bit stream server initiate transmission of a bit stream representing the requested title or the requested portion of the title.

The applet also builds decoder control signals from the specification of the title or the portion of the title. The decoder control signals direct a bit stream decoder to receive the requested bit stream from the bit stream server and to decode a motion video signal from the bit stream. The applet transmits the decoder control signals to the decoder to cause the decoder to receive the bit stream and to decode the motion video signal from the bit stream.

By using an applet of a multimedia document viewer to request and control receipt by a decoder of a motion video bit stream and to control decoding of the motion video bit stream by the decoder, a designer of a multimedia document can easily and conveniently include motion video images in multimedia documents. In addition, since the applet transmits bit stream control signals to a video server, the motion video signals which can be incorporated into a multimedia document are any such motion video signals stored in such a video server. Such video servers will likely include a large number and wide variety of motion video signals, thereby providing a wealth of motion video content for inclusion in multimedia documents.

DETAILED DESCRIPTION

Figure 1:
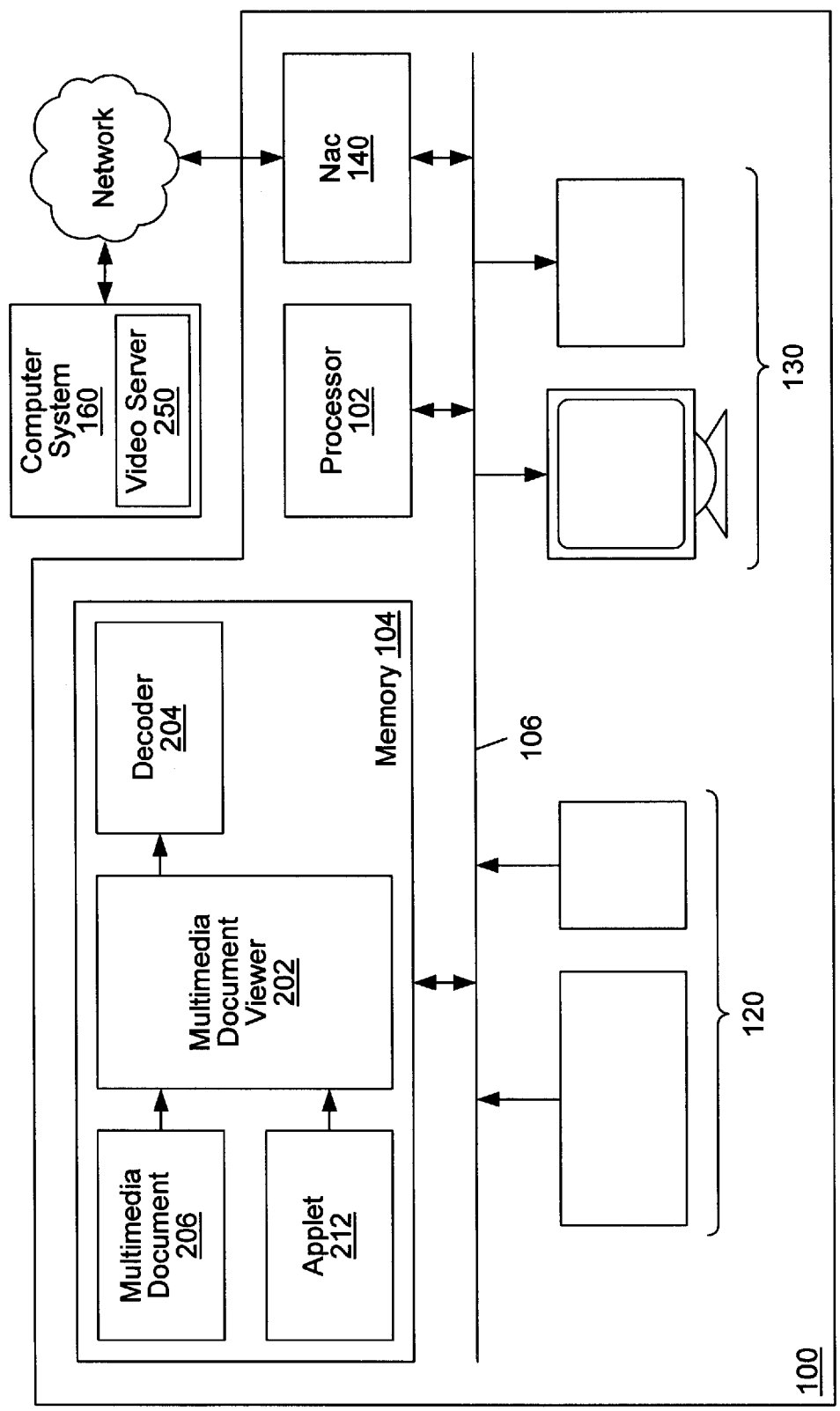
FIG. 1 is a block diagram of a computer system which is connected to a video server through a network and which includes a multimedia document viewer which in turn processes an applet to include motion video images in a representation of a multimedia document in accordance with the presenting invention.

In accordance with the present invention, a multimedia document 206 (FIG. 2) includes an applet tag 214 which causes a multimedia document viewer 202 to execute an applet 212. Execution of applet 212 requests transmission of a bit stream of a particular title from a video server 250 and controls receipt and decoding of the bit stream by a decoder 204. Decoder 204, in response to control signals received from applet 212, decodes the received bit stream to produce a motion video image and displays the motion video image as an integral part of the representation of multimedia document 206. To include a motion video image as an integral part of a multimedia document, a designer of the multimedia document simply includes in the multimedia document an applet tag, e.g., applet tag 214, which specifies (i) applet 212, (ii) video server 250 as the source of a bit stream, and (iii) the particular bit stream to request from video server 250. A brief description of the operating environment of multimedia document viewer 202 and applet 212 facilitates appreciation of the present invention.

FIG. 1 is a block diagram of a computer system 100 which is generally of the architecture of most computer systems available today. Computer system 100 includes a processor 102 which fetches computer instructions from a memory 104 through a bus 106 and executes those computer instructions. In executing computer instructions fetched from memory 104, processor 102 can retrieve data from or write data to memory 104, display information on one or more computer display devices 130, or receive command signals from one or more user-input devices 120. Processor 102 can be, for example, any of the SPARC processors available from Sun Microsystems, Inc. of Mountain View, Calif. Memory 104 can include any type of computer memory including, without limitation, randomly accessible memory (RAM), read-only memory (ROM), and storage devices which include magnetic and optical storage media such as magnetic or optical disks. Computer 100 can be, for example, any of the SPARCstation workstation computer systems available from Sun Microsystems, Inc. of Mountain View, Calif.

Sun, Sun Microsystems, the Sun Logo, Java and Hot Java are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Computer display devices 130 can include generally any computer display device such as a printer, a cathode ray tube (CRT), light-emitting diode (LED) display, or a liquid crystal display (LCD). User input devices 120 can include generally any user input device such as a keyboard, a keypad, an electronic mouse, a trackball, a digitizing tablet, thumbwheels, a light-sensitive pen, a touch-sensitive pad, or voice-recognition circuitry.

Computer system 100 also includes network access circuitry 140 which is coupled to processor 102 and memory 104 through bus 106 and which is coupled to a network 150. In accordance with control signals received from processor 102 through bus 106, network access circuitry 140 coordinates transfer of data through network 150 between network access circuitry 140 and similar network access circuitry (not shown) in computer 100B or other computer systems coupled to computer system 100 through network 150. The transfer of data through network 150 is conventional. Since a video stream representing a VHS-quality motion picture encoded in MPEG-1 format has a bit rate of approximately 1.5 Mbit/second to 2 Mbit/second, a useful minimum threshold is that network access circuitry 140 is capable of receiving data at a rate of at least 2 Mbit/second. Higher quality motion video images have bit rates as high as 8 Mbit/second or higher. Therefore, in one embodiment, network access circuitry 140 is capable of receiving data at a rate of at least 8 Mbit/second. Network access circuitry 140 can be generally any circuitry which is used to transfer data between a computer system and network such as computer system 100 and network 150 and can be, for example, an Ethernet controller chip.

A number of computer processes execute in processor 102 from memory 104, including a multimedia document viewer 202 and a decoder 204. Multimedia document viewer 202 is a computer process which reads a multimedia document 206 and displays the multimedia information specified in multimedia document 206 in one or more of computer display devices 130. In one embodiment, multimedia document 206 is a document in HTML format and multimedia document viewer 202 is an HTML viewer such as the Netscape World Wide Web browser available from Netscape Communications Corporation of Mountain View, Calif. Multimedia document viewer 202 and multimedia document 206 are shown in greater detail in FIG. 2.

Multimedia document viewer 202 retrieves data and tags from a multimedia document such as multimedia document 206. A tag is data which is not itself substantive content of a multimedia document but instead provides format information and can include specification of substantive content which is to be included in the multimedia document and which is located in memory 104 outside of multimedia document 206. For example, a tag can specify a file stored in memory 104 as containing a graphical image which is to be included as substantive content of multimedia document 206. The data and tags of multimedia document 206 collectively define the composition, including substantive content and formatting, of multimedia document 206; and multimedia document viewer 202 displays such substantive content in one or more of computer display devices 130 (FIG. 1) in accordance with the data and tags of multimedia document 206. In one embodiment, multimedia document 206 is an HTML document, and the data and tags of multimedia document 206 comport with the HTML language. Multimedia document 206 includes an applet tag 214 (FIG. 2) which specifies an applet 212 and a number of operational characteristics of applet 212 as described more completely below.

Multimedia document viewer 202 includes an applet interpreter 210 which retrieves from applet 212 computer instructions and translates such computer instructions into computer instructions of a form appropriate for execution by processor 102 (FIG. 1) and submits the translated computer instructions to processor 102 for execution. In one embodiment, applet interpreter 210 (FIG. 2) translates and submits for execution a single computer instruction of applet 212 prior to translation and submission for execution of a subsequent computer instruction of applet 212. Applet interpreter 210 can be, for example, the Java applet interpreter or the Hot Java World Wide Web browser available from Sun Microsystems, Inc. and, in such an embodiment, applet 212 comports with the Java computer instruction language interpreted by the Java applet interpreter. As described more completely below, applet 212 is a novel applet which, when executed by processor 102 (FIG. 1) through applet interpreter 210 (FIG. 2), requests a title from a video server 250 and causes the received bit stream representing the requested title to be decoded in a decoder 204 and displayed in a computer display device as an integral part of a multimedia display of multimedia document 206.

In executing the computer instructions of applet 212, applet interpreter 210 transmits, through network 150 (FIG. 1), control signals to an applications programming interface (API) 252 (FIG. 2) of a video server 250 which executes within a computer system 160 (FIG. 1). Illustrative examples of video server 250 of computer system 160 are described in the '450 Patent and the '648 Application. API 252 (FIG. 2) of video server 250 implements a remote procedure calling (RPC) protocol in which API 252 controls video server 250 in response to control signals received by API 252. For example, in response to control signals which request a title and which are transmitted to API 252 by applet interpreter 210, API 252 causes a bit pump 254 of video server 250 to initiate transmission through network 150 (FIG. 1) to decoder 204 (FIG. 2) of a bit stream representing the requested title. In addition, API 252 can transmit to applet interpreter 210 status information regarding a title stored within video server 250 or regarding a bit stream transmitted by bit pump 254 in response to control signals requesting such status information.

Decoder 204 is a computer process executing within processor 102 (FIG. 1) from memory 104. Decoder 204 receives data representing a motion video display encoded in a particular format. In one embodiment, decoder 204 is the MPEG Expert (MPX) decoder available from Applied Vision and decodes motion video signals according to the MPEG-1 encoding format. Applet interpreter 210 transmits to decoder 204 control signals which control the decoding by decoder 204 of the bit stream received from bit pump 254 of video server 250. Specifically, applet interpreter 210 transmits to decoder 204 control signals directing decoder 204 to start or stop decoding the bit stream received from bit pump 254 or specifying characteristics of the bit stream received from bit pump 254 such as the bit rate, encoding format, and the coordinates of a particular location within one or more of computer display devices 130 (FIG. 1) in which to display the decoded motion video images. In addition, applet 212 determines which communications port through network access circuitry 140 (FIG. 1) the bit stream is to be received and transmits to decoder 204 (FIG. 2) control signals identifying the selected communications port. Applet 212 can therefore determine which communications ports are used by other applications and can avoid conflicts resulting from access of decoder 204 of a communications port by selecting a communications port which is not used by another computer process of computer system 100 (FIG. 1).

Figure 2:
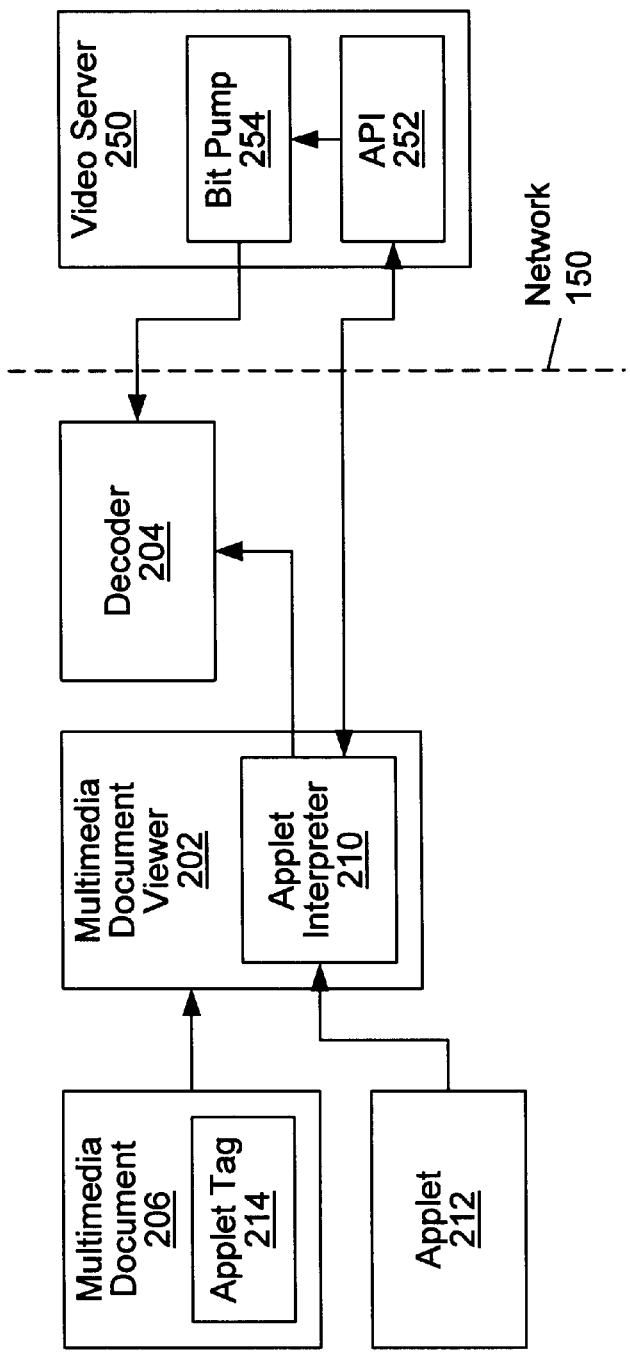
FIG. 2 is a block diagram showing the multimedia document viewer, applet, and video server of FIG. 1 in greater detail.
Figure 3:
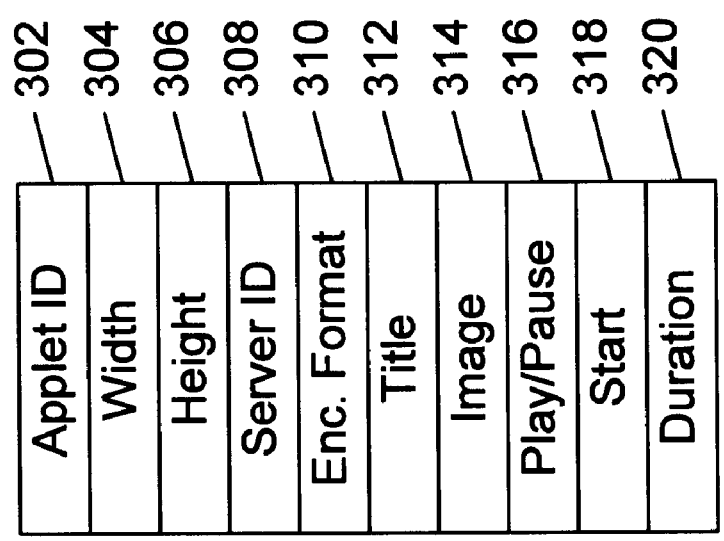
FIG. 3 is a block diagram of an applet tag of FIG. 2 in greater detail.

Applet tag 214 is shown in greater detail in FIG. 3. Applet tag 214 includes a number of fields which collectively define a bit stream to be received and decoded for display by decoder 204 (FIG. 2). A field is a collection of data which collectively define a item of information. Applet tag 214 includes (i) an applet identifier field 302, (ii) a width field 304, (iii) a height field 306, (iv) a server identifier field 308, and (v) an encoding format field 310. Applet tag 214 can also include any of the following optional fields: (vi) a title field 312, (vii) an image field 314, (viii) a play/pause field 316, (ix) a start field 318, and (x) a duration field 320.

Applet identifier field 302 specifies applet 212 as the applet to be retrieved and executed by applet interpreter 210. Width field 304 and height field 306 specify the width and height, respectively, in display coordinate space of a computer display device, i.e., specify the size of the viewport in which the decoded motion video image is displayed. Server identifier field 308 specifies video server 250 (FIG. 2) as the source of the desired bit stream. Encoding format field 310 (FIG. 3) specifies the particular encoding format, e.g., MPEG1SYS encoding format, of the bit stream received by decoder 204 (FIG. 2). Title field 312 (FIG. 3) specifies the particular title to be retrieved from server 250 (FIG. 2). Alternatively, title field 312 can specify the address of a multicast bit stream.

Image field 314 (FIG. 3), if included, specifies a still video image to be displayed in the space specified by width field 304 and height field 306 if the title specified by title field 312 is unavailable. Play/pause field 316, if included, specifies whether the motion video image received from video server 250 (FIG. 2) is initially in a play state or in a paused state. Start field 318 (FIG. 3), if included, specifies an offset into the title of a portion of the title, i.e., the point within the title at which the bit stream should begin. For example, start field 318 can specify that the requested bit stream begin at 3 minutes and 10 seconds into the title. Duration field 320, if included specifies the duration of a desired portion of the title. For example, duration field 320 can specify that a 30-minute portion of the title is requested. In one embodiment, start field 318 and duration field 320 are specified in terms of an integer number of nanoseconds.

Thus, by specifying the few fields described above and shown in FIG. 3, a designer of multimedia document 206 can include as an integral part of multimedia document 206 a motion video image retrieved from video server 250. The following is an illustrative example of applet tag 214 in HTML format.

<applet code="SunMediaCenterPlayer.class" width=704 height=520> param name=port value—"1973">

<param name=format value="MPEG1SYS">

<param name=host value="sqas-6">

<param name=img value"/images/bkgx.gif">

</applet>

Figure 4:
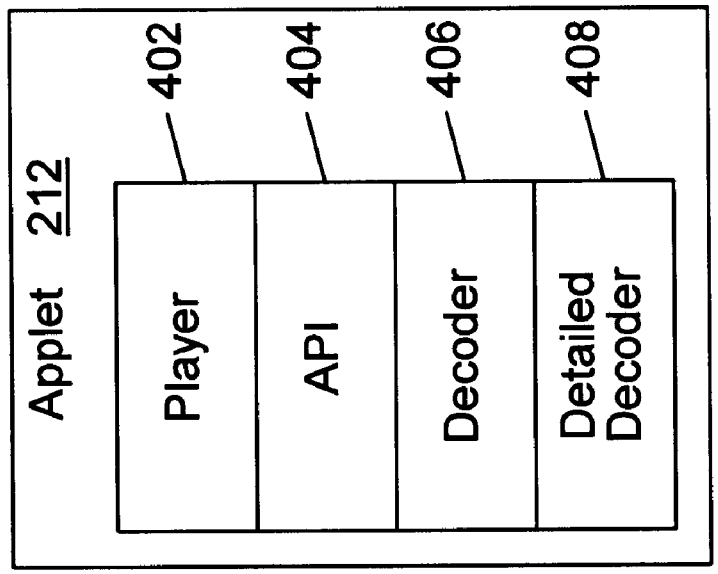
FIG. 4 is a block diagram of the applet of FIG. 2 in greater detail.

Applet 212 (FIG. 2) includes computer instructions which, when executed, request a title from video server 250 and control decoding and display of the decoded motion video signals by decoder 204 and is shown in greater detail in FIG. 4. The computer instructions of applet 212 are organized into various levels, each of which defines a respective component of the behavior of applet 212. Applet 212 includes a player level 402, an API level 404, a decoder level 406, and a detailed decoder level 408.

Player level 402 includes computer instructions which, when executed, implement a graphical user interface in which a user can control the bit stream received from video server 250 (FIG. 2) and the display of the decoded motion video signals of the bit stream by physical manipulation of one or more of user input devices 120 (FIG. 1). In one embodiment, the computer instructions of player level 402 (FIG. 4), when executed, cause graphical and/or textual representation of control mechanisms to be displayed in one or more of computer display devices 130 (FIG. 1). Such control mechanisms are known and conventional and include, without limitation, virtual buttons, pull-down menus, virtual radio buttons, virtual check boxes, and sliding scroll bars. In a conventional manner, a user activates one or more of such control mechanisms by physical manipulation of one or more of user input devices 120 (FIG. 1) and such physical manipulation results in receipt by player level 402 (FIG. 4) of applet 212 of signals and/or data representing such activation.

API level 404 includes computer instructions which, when executed, implement the RPC protocol of API 252 (FIG. 2) of video server 250 and invoke RPC calls to API 252 to control the bit stream transmitted by bit pump 254 in accordance with interaction of a user with the graphical user interface implemented by player level 402 (FIG. 4).

Decoder level 406 and detailed decoder level 408 collectively control operation of decoder 204 (FIG. 2), generally controlling the decoding of the bit stream received from video server 250 by decoder 204 and the display in a computer display device of the decoded motion video image. Decoder level 406 includes computer instructions and data structures which are not specific to any particular decoder, while detailed decoder level 408 includes computer instructions and data structures which are specific to decoder 204. It is generally preferred that detailed decoder level 408 is as small and simple as possible such that the majority of computer instructions of decoder levels 406 and 408 are included in decoder level 406. Accordingly, adapting applet 212 (FIG. 2) to operate in conjunction with a decoder other than decoder 204 requires modification of only detailed decoder level 408 and, therefore, as little modification as possible.

Microfiche Appendix A is a computer source code listing of a preferred embodiment of applet 212. The modules of Microfiche Appendix A are written in the Java applet computer instruction language developed by Sun Microsystems, Inc. of Mountain View, Calif. The computer instructions of the Java applet computer instruction language are object-oriented, and each of the modules of Microfiche Appendix A represents a respective class of objects. Player level 402 (FIG. 4), in this embodiment, includes classes SunMediaCenterPlayer, Player, and PositionSlider as defined in the computer source code listing of Microfiche Appendix A. API level 404, in this embodiment, includes classes MsmPlayer, MsmSession, MsmAccessRight, MsmPersistence, MsmPlaylist, MsmToString, MsmItem, MsmTitleItem, MsmDeadAirItem, MsmException, XdrBlock, and PortMapper as defined in the computer source code listing of Microfiche Appendix A. Decoder level 406, in this embodiment, includes classes Decoder and DecoderImpl as defined in the computer source code listing of Microfiche Appendix A. Detailed decoder level 408, in this embodiment, includes class MpxDecoderImpl as defined in the computer source code listing of Microfiche Appendix A.

In the preferred embodiment of the present invention defined by Microfiche Appendix A, a module "loop" includes computer instructions of the C computer instruction language and defines a loop computer process which executes independently of multimedia document viewer 202 (FIG. 2). The loop computer process cooperates with multimedia document viewer 202 and decoder 204 to request and receive from video server 250 bit streams representing multicast motion video signals.

The above description is illustrative only and is not limiting. The present invention is therefore defined solely and completely by the appended claims together with their full scope of equivalents.

What is claimed is:

1. An applet, capable of executing within a computer system for requesting and controlling decoding of a bit stream specified in a multimedia document stored in a memory of the computer system, the applet comprising:

an API module; and a decoder module operatively coupled to the API module;

wherein the API module is configured to build, from a specification of the bit stream in the multimedia document, bit stream control signals which request transmission of the bit stream from a bit stream server and which are in a form appropriate for processing by the bit stream server;

wherein the API module is further configured to transmit the bit stream control signals to the bit stream server to thereby request the bit stream from the bit stream server;

wherein the decoder module is configured to build, from the specification of the bit stream in the multimedia document, decoder control signals which direct a decoder to receive the bit stream from the bit stream server and which are in a form appropriate for processing by the decoder; and wherein the decoder module is further configured to transmit the decoder control signals to the decoder to thereby cause the decoder to receive and decode the bit stream.

2. The applet of claim 1, wherein the decoder module is further configured to build, from the specification of the bit stream in the multimedia document, display control signals which direct the decoder to perform one or more display control actions for controlling a display of motion video decoded by the decoder in at least one of one or more display devices coupled to the computer system, wherein the display control signals are in a form appropriate for processing by the decoder; and wherein the decoder module is further configured to transmit the display control signals to the decoder to thereby cause the decoder to perform the one or more display control actions.

3. The applet of claim 1, further comprising:

a player module operatively coupled to the API module;

wherein the player module is configured to display one or more control mechanisms on one or more display devices coupled to the computer system, wherein the control mechanisms are configured to be manipulated by a user of the computer system by physical manipulation of one or more input devices coupled to the computer system.

4. The applet of claim 3, wherein the player module is further configured to receive bit stream control information from at least one of the one or more control mechanisms in response to the user manipulating the at least one of the one or more control mechanisms; and wherein the player module is further configured to transmit the bit stream control information to the API module.

5. The applet of claim 4, wherein the API module is further configured to receive the bit stream control information from the player module;

wherein the API module is further configured to build, from the bit stream control information, bit stream control signals which control transmission of the bit stream from the bit stream server and which are in a form appropriate for processing by the bit stream server; and wherein the API module is further configured to transmit the bit stream control signals to the bit stream server to thereby control the bit stream from the bit stream server.

6. The applet of claim 4, wherein the player module is further configured to receive display control information from at least one of the one or more control mechanisms, wherein the display control information specifies one or more display control actions for controlling the display of motion video decoded by the decoder in at least one of the one or more display devices; and wherein the player module is further configured to transmit the display control information to the decoder module.

7. The applet of claim 6, wherein the decoder module is farther configured to receive the display control information from the player module;

wherein the decoder module is further configured to build, from the display control information, display control signals which direct the decoder to perform the one or more display control actions and which are in a form appropriate for processing by the decoder; and wherein the decoder module is further configured to transmit the display control signals to the decoder to thereby cause the decoder to perform the one or more display control actions.

8. The applet of claim 3, wherein the player module is further configured to receive display control information from at least one of the one or more control mechanisms, wherein the display control information specifies one or more display control actions for controlling a display of motion video decoded by the decoder in at least one of the one or more display devices; and wherein the player module is further configured to transmit the display control information to the decoder module.

9. The applet of claim 8, wherein the decoder module is further configured to receive the display control information from the player module;

wherein the decoder module is further configured to build, from the display control information, display control signals which direct the decoder to perform the one or more display control actions and which are in a form appropriate for processing by the decoder; and wherein the decoder module is further configured to transmit the display control signals to the decoder to thereby cause the decoder to perform the one or more display control actions.

10. The applet of claim 1, wherein the applet is configured to select, from a plurality of communications ports provided to the computer system by network access circuitry coupled to the computer system, a communications port for receiving the bit stream;

wherein the decoder module is configured to build decoder control signals which identify the communications port for receiving the bit stream and which are in a form appropriate for processing by the decoder; and wherein the decoder module is further configured to transmit the decoder control signals to the decoder to thereby direct the decoder to use the communications port for receiving the bit stream.

11. The applet of claim 1, wherein the bit stream is a multicast bit stream.

12. A computer system comprising a processor and a memory and further comprising an applet which in turn executes in the processor from the memory and requests and controls decoding of a bit stream specified in a multimedia document stored in the memory, the applet comprising:

an API module; and a decoder module operatively coupled to the API module;

wherein the API module is configured to build, from a specification of the bit stream in the multimedia document, bit stream control signals which request transmission of the bit stream from a bit stream server and which are in a form appropriate for processing by the bit stream server;

wherein the API module is further configured to transmit the bit stream control signals to the bit stream server to thereby request the bit stream from the bit stream server;

wherein the decoder module is configured to build, from the specification of the bit stream in the multimedia document, decoder control signals which direct a decoder to receive the bit stream from the bit stream server and which are in a form appropriate for processing by the decoder; and wherein the decoder module is further configured to transmit the decoder control signals to the decoder to thereby cause the decoder to receive and decode the bit stream.

13. The computer system of claim 12, further comprising:

one or more display devices coupled to the computer system;

wherein the decoder module is further configured to build, from the specification of the bit stream in the multimedia document, display control signals which direct the decoder to perform one or more display control actions for controlling a display of motion video decoded by the decoder in at least one of the one or more display devices, wherein the display control signals are in a form appropriate for processing by the decoder; and wherein the decoder module is further configured to transmit the display control signals to the decoder to thereby cause the decoder to perform the one or more display control actions.

14. The computer system of claim 12, further comprising:

one or more display devices coupled to the computer system, and one or more input devices coupled to the computer system;

wherein the applet further comprises:

a player module operatively coupled to the API module;

wherein the player module is configured to display one or more control mechanisms on at least one of the one or more display devices, wherein the control mechanisms are configured to be manipulated by a user of the computer system by physical manipulation of at least one of the one or more input devices.

15. The computer system of claim 14, wherein the player module is further configured to receive bit stream control information from at least one of the one or more control mechanisms in response to the user manipulating the at least one of the one or more control mechanisms; and wherein the player module is further configured to transmit the bit stream control information to the API module.

16. The computer system of claim 15, wherein the API module is further configured to receive the bit stream control information from the player module;

wherein the API module is further configured to build, from the bit stream control information, bit stream control signals which control transmission of the bit stream from the bit stream server and which are in a form appropriate for processing by the bit stream server; and wherein the API module is further configured to transmit the bit stream control signals to the bit stream server to thereby control the bit stream from the bit stream server.

17. The computer system of claim 15, wherein the player module is further configured to receive display control information from at least one of the one or more control mechanisms, wherein the display control information specifies one or more display control actions for controlling the display of motion video decoded by the decoder in at least one of the one or more display devices; and wherein the player module is further configured to transmit the display control information to the decoder module.

18. The computer system of claim 17, wherein the decoder module is further configured to receive the display control information from the player module;

wherein the decoder module is further configured to build, from the display control information, display control signals which direct the decoder to perform the one or more display control actions and which are in a form appropriate for processing by the decoder; and wherein the decoder module is further configured to transmit the display control signals to the decoder to thereby cause the decoder to perform the one or more display control actions.

19. The computer system of claim 14, wherein the player module is further configured to receive display control information from at least one of the one or more control mechanisms, wherein the display control information specifies one or more display control actions for controlling the display of motion video decoded by the decoder in at least one of the one or more display devices; and wherein the player module is further configured to transmit the display control information to the decoder module.

20. The computer system of claim 19, wherein the decoder module is further configured to receive the display control information from the player module;

wherein the decoder module is further configured to build, from the display control information, display control signals which direct the decoder to perform the one or more display control actions and which are in a form appropriate for processing by the decoder; and wherein the decoder module is further configured to transmit the display control signals to the decoder to thereby cause the decoder to perform the one or more display control actions.

21. The computer system of claim 12, wherein the applet is configured to select, from a plurality of communications ports provided to the computer system by network access circuitry coupled to the computer system, a communications port for receiving the bit stream;

wherein the decoder module is configured to build decoder control signals which identify the communications port for receiving the bit stream and which are in a form appropriate for processing by the decoder; and wherein the decoder module is further configured to transmit the decoder control signals to the decoder to thereby direct the decoder to use the communications port for receiving the bit stream.

22. The computer system of claim 12, further comprising:

a display device coupled to the computer system, and a multimedia document viewer executable on the processor;

wherein the multimedia document comprises information specifying the appearance and contents of a multimedia document viewer display page;

wherein the multimedia document viewer is configured to:

display one or more titles of motion video in the multimedia document viewer display page displayed on the display device, wherein the one or more titles me specified in information retrieved from the multimedia document.

23. The computer system of claim 22, further comprising:

wherein the multimedia document viewer is further configured to:

retrieve an applet tag from the multimedia document in response to a user selecting a title from the one or more titles displayed on the multimedia document viewer display page;

wherein the applet tag comprises the specification of the bit stream, and wherein the applet tag further comprises information describing the applet.

24. The computer system of claim 23, wherein the multimedia document viewer is further configured to initiate the execution of the applet on the processor in response to said retrieving the applet tag.

25. The computer system of claim 12, wherein the bit stream is a multicast bit stream.

26. A method for retrieving and displaying on a computer a motion video from a server which is operatively coupled to the computer through a network, the method comprising:

retrieving an applet tag from a multimedia document, wherein the applet tag comprises information describing the motion video associated with the applet tag, and wherein the information further describes an applet for retrieving, decoding and displaying the motion video;

executing the applet on the computer in response to said retrieving the applet tag;

the applet building, from the applet tag, bit stream control signals which request a bit stream representing the motion video, wherein the bit stream control signals are in a form appropriate for processing by the server;

the applet transmitting the bit stream control signals to the server to thereby request from the server a bit stream representing the motion video;

the applet building, from the applet tag, decoder control signals which direct a decoder comprised in the computer to receive the bit stream transmitted from the server, wherein the decoder control signals are in a form appropriate for processing by the decoder; and the applet transmitting the decoder control signals to the decoder to thereby cause the decoder to receive and decode the bit stream representing the motion video.

27. The method of claim 26, further comprising:

displaying one or more titles of motion videos on a display device coupled to the computer, wherein the one or more titles are specified in information retrieved from the multimedia document; and a user selecting a title from the one or more titles displayed on the display device;

wherein said retrieving the applet tag from the multimedia document is performed in response to said selecting the title from the one or more titles displayed on the display device.

28. The method of claim 26, further comprising:

retrieving from the multimedia document information specifying the appearance and contents of a multimedia document viewer display page;

displaying the multimedia document viewer display page on a display device coupled to the computer in response to said retrieving the information from the multimedia document;

displaying one or more titles of motion videos in the multimedia document viewer display page displayed on a display device coupled to the computer, wherein the one or more titles are specified in information retrieved from the multimedia document; and a user selecting a title from the one or more titles displayed on the multimedia document viewer display page;

wherein said retrieving the applet tag from the multimedia document is performed in response to said selecting the title from the one or more titles displayed on the multimedia document viewer display page.

29. The method of claim 26, further comprising:

the server receiving the bit stream control signals; and the server transmitting the bit stream to the computer in response to said receiving the bit stream control signals.

30. The method of claim 29, further comprising:

the decoder receiving the decoder control signals;

the decoder receiving the bit stream transmitted from the server in response to said receiving the decoder control signals; and the decoder decoding the bit stream in response to said receiving the bit stream, wherein decoding the bit stream produces the motion video.

31. The method of claim 30, further comprising:

displaying on a display device the motion video produced by said decoding the bit stream.

32. The method of claim 26, further comprising:

displaying one or more control mechanisms on a display device coupled to the computer, wherein the control mechanisms are configured to be manipulated by a user of the computer system by physical manipulation of one or more input devices coupled to the computer system.

33. The method of claim 32, further comprising:

the applet receiving bit stream control information from at least one of the one or more control mechanisms in response to the user manipulating the at least one of the one or more control mechanisms;

the applet building, from the bit stream control information, bit stream control signals for controlling transmission of the bit stream from the server, wherein the bit stream control signals are in a form appropriate for processing by the server; and the applet transmitting the bit stream control signals to the server to thereby control the bit stream from the server.

34. The method of claim 33, further comprising:

the server receiving the bit stream control signals; and the server modifying transmission of the bit stream to the computer in response to said receiving the bit stream control signals.

35. The method of claim 32, further comprising:

the applet receiving display control information from at least one of the one or more control mechanisms, wherein the display control information specifies one or more display control actions for controlling the display of the motion video decoded by the decoder on the display device;

the applet building, from the display control information, display control signals which direct the decoder to perform the one or more display control actions and which are in a form appropriate for processing by the decoder; and the applet transmitting the display control signals to the decoder to thereby cause the decoder to perform the one or more display control actions.

36. The method of claim 26, further comprising:

the applet selecting, from a plurality of communications ports provided to the computer system by network access circuitry coupled to the computer system, a communications port for receiving the bit stream;

the applet building decoder control signals which identify the communications port for receiving the bit stream, wherein the decoder control signals are in a form appropriate for processing by the decoder; and the applet transmitting the decoder control signals to the decoder to thereby direct the decoder to use the communications port for receiving the bit stream.

37. The method of claim 26, wherein the bit stream is a multicast bit stream.

38. A carrier medium comprising program instructions, wherein the program instructions are computer-executable to implement:

retrieving an applet tag from a multimedia document, wherein the applet tag comprises information describing a motion video associated with the applet tag, and wherein the information further describes an applet for retrieving, decoding and displaying the motion video;

executing the applet on a computer in response to said retrieving the applet tag;

the applet building, from the applet tag, bit stream control signals which request a bit stream representing the motion video, wherein the bit stream control signals are in a form appropriate for processing by the server;

the applet transmitting the bit stream control signals to the server to thereby request from the server a bit stream representing the motion video;

the applet building, from the applet tag, decoder control signals which direct a decoder comprised in the computer to receive the bit stream transmitted from the server, wherein the decoder control signals are in a form appropriate for processing by the decoder; and the applet transmitting the decoder control signals to the decoder to thereby cause the decoder to receive and decode the bit stream representing the motion video.

39. The carrier medium of claim 38, wherein the program instructions are further computer-executable to implement:

displaying one or more titles of motion videos on a display device coupled to the computer, wherein the one or more titles are specified in information retrieved from the multimedia document; and a user selecting a title from the one or more titles displayed on the display device;

wherein said retrieving the applet tag from the multimedia document is performed in response to said selecting the title from the one or more titles displayed on the display device.

40. The carrier medium of claim 38, wherein the program instructions are further computer-executable to implement:

displaying on a display device the motion video produced by said decoding the bit stream.

41. The carrier medium of claim 38, wherein the program instructions are further computer-executable to implement:

displaying one or more control mechanisms on a display device coupled to the computer, wherein the control mechanisms are configured to be manipulated by a user of the computer system by physical manipulation of one or more input devices coupled to the computer system.

42. The carrier medium of claim 41, wherein the program instructions are further computer-executable to implement:

the applet receiving bit stream control information from at least one of the one or more control mechanisms in response to the user manipulating the at least one of the one or more control mechanisms;

the applet building, from the bit stream control information, bit stream control signals for controlling transmission of the bit stream from the server, wherein the bit stream control signals are in a form appropriate for processing by the server; and the applet transmitting the bit stream control signals to the server to thereby control the bit stream from the server.

43. The carrier medium of claim 41, wherein the program instructions are further computer-executable to implement:

the applet receiving display control information from at least one of the one or more control mechanisms, wherein the display control information specifies one or more display control actions for controlling the display of the motion video decoded by the decoder on the display device;

the applet building, from the display control information, display control signals which direct the decoder to perform the one or more display control actions and which are in a form appropriate for processing by the decoder; and the applet transmitting the display control signals to the decoder to thereby cause the decoder to perform the one or more display control actions.

44. The carrier medium of claim 38, wherein the program instructions are further computer-executable to implement:

the applet receiving display control information from at least one of the one or more control mechanisms, wherein the display control information specifies one or more display control actions for controlling the display of the motion video decoded by the decoder on the display device;

the applet building, from the display control information, display control signals which direct the decoder to perform the one or more display control actions and which are in a form appropriate for processing by the decoder; and the applet transmitting the display control signals to the decoder to thereby cause the decoder to perform the one or more display control actions.

45. The carrier medium of claim 38, wherein the program instructions are further computer-executable to implement:

the applet selecting, from a plurality of communications ports provided to the computer system by network access circuitry coupled to the computer, a communications port for receiving the bit stream;

the applet building decoder control signals which identify the communications port for receiving the bit stream, wherein the decoder control signals are in a form appropriate for processing by the decoder; and the applet transmitting the decoder control signals to the decoder to thereby direct the decoder to use the communications port for receiving the bit stream.

* * * * *